US006816323B2

(12) United States Patent
Colin et al.

(10) Patent No.: US 6,816,323 B2
(45) Date of Patent: Nov. 9, 2004

(54) COUPLING WITH STRONG LENS AND WEAK LENS ON FLEXURE

(75) Inventors: Sylvain M. Colin, Milpitas, CA (US); Marc A. Finot, Palo Alto, CA (US); Robert M. Kohler, Mountain View, CA (US); Jean-Marc M. Verdiell, Palo Alto, CA (US); Siva M. Yegnanarayanan, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/264,533

(22) Filed: Oct. 3, 2002

(65) Prior Publication Data

US 2004/0066559 A1 Apr. 8, 2004

(51) Int. Cl.[7] .............................. G02B 7/02; H01S 3/08
(52) U.S. Cl. ....................... 359/819; 359/820; 359/822; 359/811; 359/813; 372/101
(58) Field of Search ................................. 359/819, 820, 359/822, 813, 814, 811, 642; 372/101, 92, 98

(56) References Cited

U.S. PATENT DOCUMENTS

| 5,257,279 | A | * | 10/1993 | Dugan et al. ................ 372/101 |
| 5,825,792 | A | | 10/1998 | Villeneuve et al. |
| 5,963,686 | A | | 10/1999 | Zheng et al. |
| 5,963,695 | A | | 10/1999 | Joyce |
| 6,207,950 | B1 | | 3/2001 | Verdiell |
| 6,227,724 | B1 | | 5/2001 | Verdiell |
| 2002/0176476 | A1 | * | 11/2002 | Vakhshoori et al. ........ 372/101 |

OTHER PUBLICATIONS

Keith Anderson, "Design and Manufacturability Issue of a Co–Packaged DFB/MZ Module," IEEE: Electronic Components and Technology Conference, 1999, pp. 197–200.

* cited by examiner

Primary Examiner—Georgia Epps
Assistant Examiner—Jack Dinh
(74) Attorney, Agent, or Firm—Kevin A. Reif

(57) ABSTRACT

Modern optoelectronic components have very tight coupling tolerances. Small misalignments of a strong lens that occur during the alignment and bonding process seriously degrade optical coupling. A weak lens is actively mounted using a flexure to correct misalignments of the strong lens. Since the weak lens does not exert as much steering force on a beam for a similar movement as the strong lens, misalignments that may occur during weak lens positioning and bonding do not appreciably degrade coupling.

17 Claims, 5 Drawing Sheets

US 6,816,323 B2

COUPLING WITH STRONG LENS AND WEAK LENS ON FLEXURE

FIELD OF THE INVENTION

Embodiments of the invention relate to optoelectronic assembly and, more particularly, to methods and apparatuses for facilitating precision alignment between various optoelectronic components.

BACKGROUND INFORMATION

One of the major challenges in the optoelectronic assembly process is to couple light from one chip to another chip or waveguide while maintaining tight tolerances. In brief, the alignment process can generally be summarized in just a couple of steps.

First, the two components are aligned. Tight tolerances are required. For example, tolerances of less than 50 nm of precision are not uncommon between the components. Second, the components must be bonded or otherwise secured to a surface while being careful to keep the alignment.

Finally, the assembly needs to be reliable. That is, the finished assembly including the bonding must be stable under temperature cycling, aging, shock, vibration, and any other condition that the assembly may reasonably be expected to encounter. To further complicate matters, most assemblies include more than just two components which must all be aligned. Each additional component further adds to the challenge. It is very difficult to hold the alignment while making the bond. Often some shift or movement occurs between the components which, if greater than the minimum tolerances dictate, may render the component unworkable or at least seriously degrade performance.

DETAILED DESCRIPTION

One embodiment of the present invention uses a combination of strong lenses and weak lenses to meet tight alignment tolerances. A strong lens is a lens which exhibits a large steering influence on a beam while a weak lens is one that exhibits a smaller steering influence on a beam. A strong lens is any small focal length lens and may include, for example, molded asphere lenses, graded index (GRIN) lenses, or ball lenses having a small focal length. By contrast, a weak lens is any large focal length lens and may also include molded asphere lenses, GRIN lenses or ball lenses configured to have a larger focal length. Of course many types and manufacturers of strong and weak lenses are commercially available with would be suitable.

Figure 1:
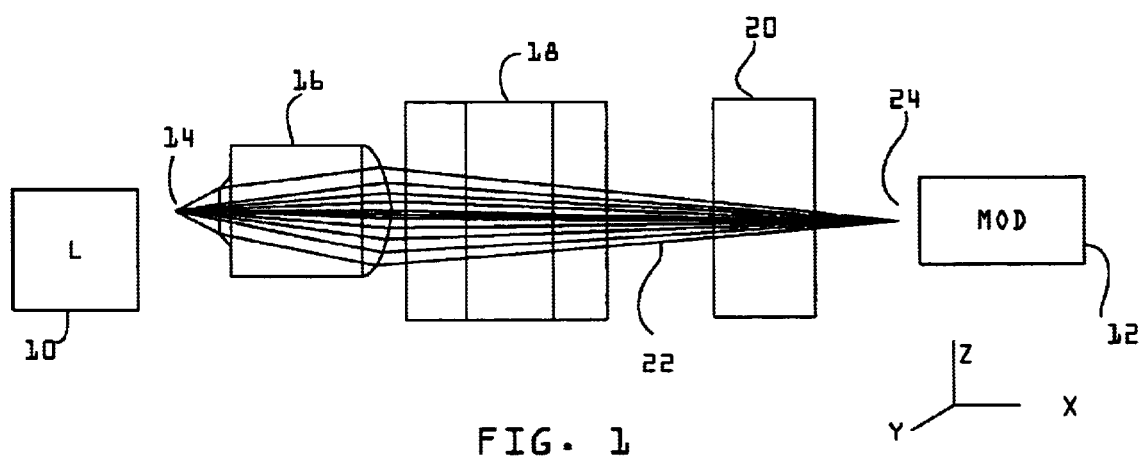
FIG. 1 is a block diagram of a lens coupling assembly coupling two optical chips; namely, a laser and a modulator.

Referring to FIG. 1, there is shown an assembly for aligning a laser on a chip 10 with a modulator on a chip 12. From left to right, there is shown a laser chip 10. A point 14 is shown to illustrate the beam emerging from the laser chip 10. Next is a strong lens 16, such as, for example, a molded asphere, an isolator 18, and finally a weak lens 20, such as, for example, a GRIN lens. The point at which the beam 22 couples with the modulator chip 12 is also illustrated simply as a point 24. The isolator 18 is optional but is useful to ensure that the light flows in only one direction and avoids feedback. The goal of course is to align the various parts so that the beam 22 optically aligns and is successfully coupled between the laser chip 10 and the modulator chip 12. Of course, while the coupling shown is between a laser and a modulator, it will be appreciated by those skilled in the art that application may be found to couple other optoelectronic components just as easily.

Figure 2:
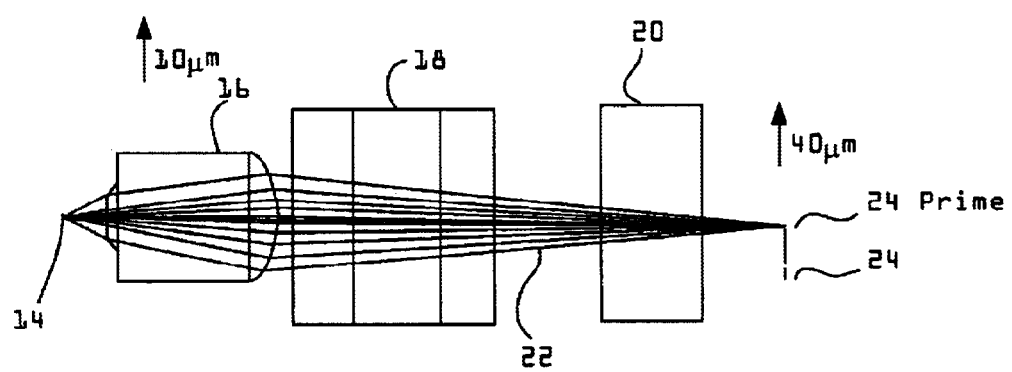
FIG. 2 is a block diagram of the lens coupling assembly illustrating the beam shift due to strong lens misalignment.

Referring to FIG. 2, the strong lens 16 is shown shifted 10 $\mu$m in the vertical direction. An unintentional alignment shift such as this may occur during the bonding process. As shown, a relatively small shift in the strong lens 16 results in a much larger shift in the final position of the beam. Here, the 10 $\mu$m shift of the strong lens 16 shifts the beam by 40 $\mu$m from point 24 to 24'. Since the strong lens 16 exerts a large steering force on the beam 22. Thus, when a strong lens is used, it must be precisely aligned since the slightest misalignment can seriously degrade coupling efficiency.

Figure 3:
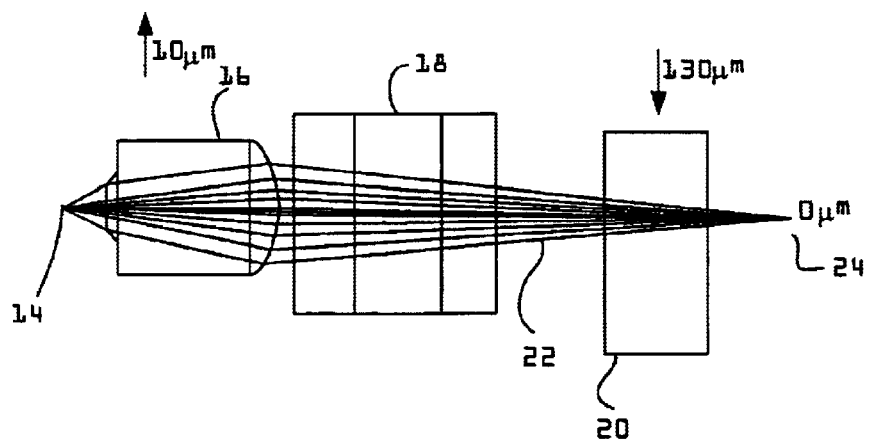
FIG. 3 is a block diagram of the lens coupling assembly illustrating a using a weak lens on a flexure to compensate for strong lens misalignment.

As shown in FIG. 3, a weak lens 20 may be used to correct misalignments of the strong lens 16. Since the weak lens 20 cannot exert as much steering force on the beam 22 small movements or repositioning of the weak lens 20 has little effect on the beam 22. In order to compensate for the misalignment of the strong lens 16, the weak lens 20 must be moved considerably further in a direction to compensate for the misalignment of the strong lens 18. Here, a 10 $\mu$m misalignment of the strong lens 18 requires, for example, a 130 $\mu$m adjustment of the weak lens 20 in the opposite direction to bring the beam focus 24 back to it optimal coupling position.

Figure 4:
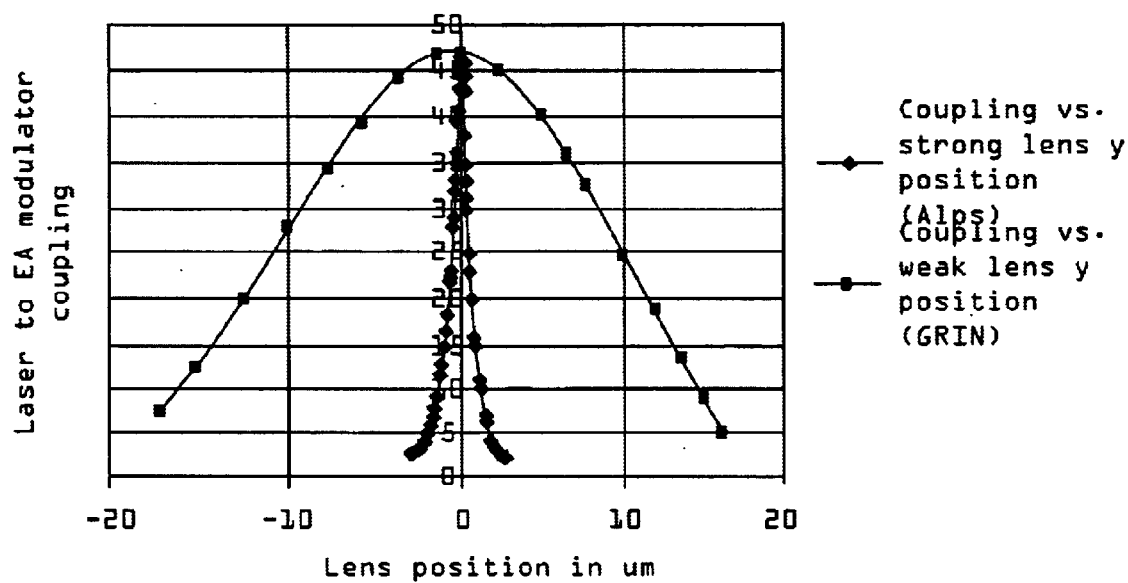
FIG. 4 is a graph comparing the coupling efficiency variation due to movement of strong and weak lenses.

FIG. 4 is a graph plotting lens position of example strong and weak lenses as a function of laser to modulator coupling efficiency with the origin (at 0 $\mu$m) being the optimum alignment position. As shown, a misalignment of the strong lens just a few $\mu$m from the origin can result in complete coupling failure. On the other hand, a much greater movement of the weak lens 20 would be required to have the same effect. Herein, this relationship between strong and weak lenses is exploited to facilitate precision alignment of components.

Figure 5:
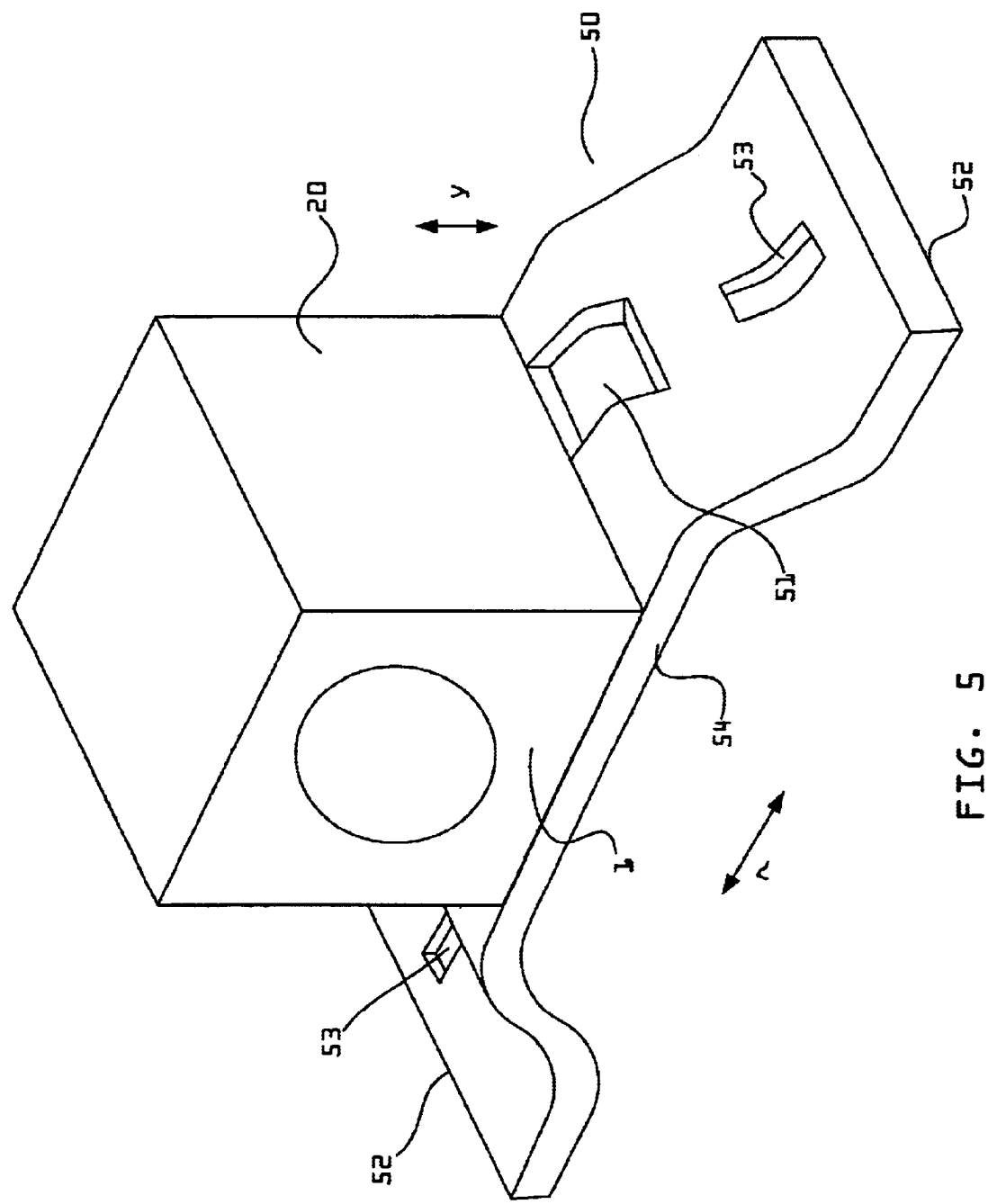
FIG. 5 is a plan view of a weak lens mounted to a two leg (bipod) flexure.

Referring to FIG. 5, one embodiment of the invention uses a flexible mount, hereinafter referred to as a flexure 50, on which to mount at least the weak lens 20. The flexure 50 allows for some amount of vertical adjustment. In one embodiment, the flexure 50 is made of thin spring steel that has been etched or stamped, then bent in a press. The flexure 50 may comprise two or more legs 52 which rest on the substrate surface or positioning floor. A two legged flexure may be referred to as a bipod flexure. In one embodiment, the legs are joined by a bridge 54 that supports the lens 20 or other optical components. Apertures between the legs 52 and the bridge 54 may be provided to increase the elasticity of the flexure 50. When the bridge 54 is translated in the y direction, opposite legs 52 give elastically in opposite x directions thus lowering the bridge and likewise changing the y-position of the lens 20. Various flexure designs are described in U.S. Pat. Nos. 6,207,950 and 6,227,724.

The flexure 50 may be designed so that in its natural or non-flexed state, the optical axis of the optical component, such as lens 20, attached to the bridge rests slightly above the optical plane of the package. Final adjustment of the height is obtained by applying pressure to the flexure 50, thereby lowering the bridge 34 height. Dragging the flexure 50 in the plane parallel to the plane of the substrate (i.e., in the x-direction) may be used to correct the lateral position. When adequate alignment is reached, the legs 52 are permanently attached to the floor or package substrate below. The attachment may be by, for example, laser welding, soldering, or adhesive bonding. Slots 53 may be provided to facilitate attachment.

Figure 6:
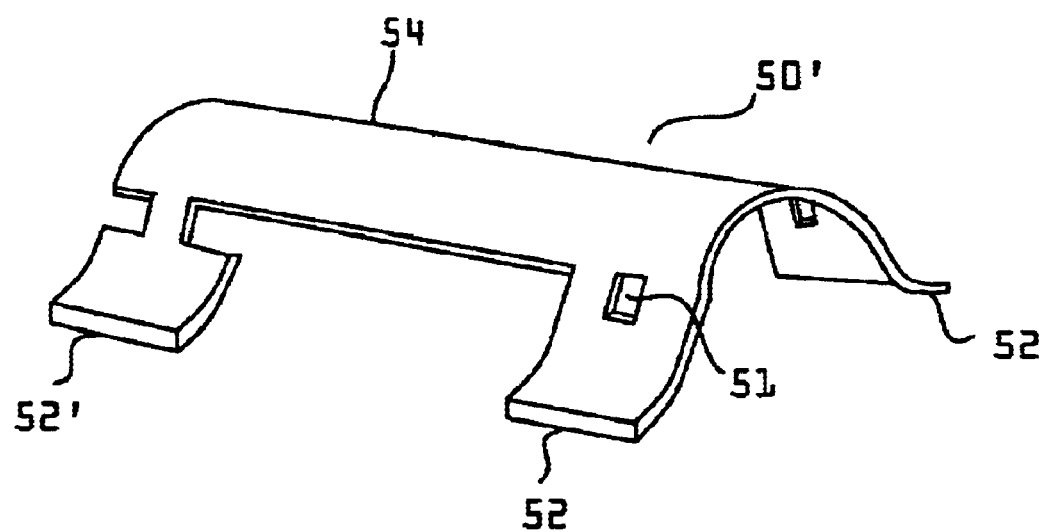
FIG. 6 is a plan view of a four legged flexure used to mount larger components.

As shown in FIG. 6, in another refinement of the flexure design, the flexure 50 has more than two legs 52. In this case, the first pair of legs 52 is attached to the frame after coarse optical alignment. The flexure is then finely realigned, using the residual flexibility left after the two first legs 52 are attached. When the optimum position is reached, the remaining legs 52' are attached. This flexure 50' would be used and a mount for physically larger components requiring alignment.

Figure 7:
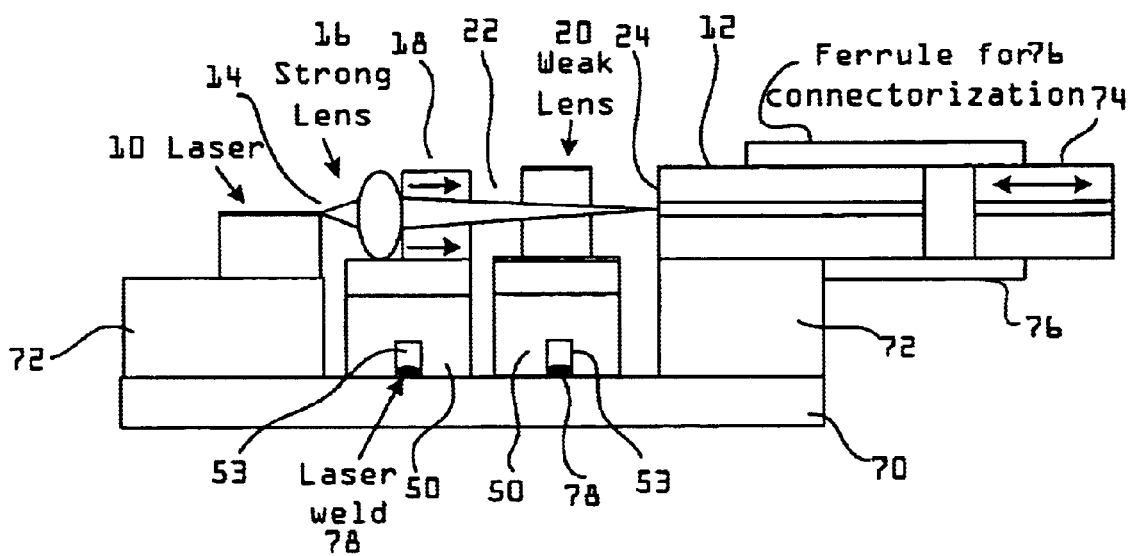
FIG. 7 is a block diagram showing a weak lens and a strong lens arrangement for a pluggable module.

Referring now to FIG. 7, an embodiment of the present invention comprises placing the weak lens 20 on a flexure. As shown, a plurality of optical components are placed on a substrate 70. A laser 10 is mounted to the substrate 70 or may be mounted on a sub-mount 72 which in turn is mounted to the substrate 70. A beam 22 originates from a laser 10 illustrated as a point source 14 to be coupled to a modulator 12 or other optical component. As previously explained, the beam 22 passes through a strong lens 16, and a weak lens 20 in its path. Other optical components may also be in the path such as an isolator 18 to keep the light from reflecting backwards. An optical fiber 74 is also shown coupled to the assembly by, for example, a ferrule 76.

During the manufacturing process, all of the components are aligned substantially as described above. That is, two components are optically aligned on the substrate 70 and then bonded with a laser weld 78 utilizing slot 53 or otherwise secured to the substrate 70 while being careful to keep the alignment. Of course, while a laser weld 78 is shown any suitable bonding method may be used such as adhesive bonding or soldering.

However, no matter the level of care used, some misalignment often occurs. Thus, the weak lens 20 is provided on a flexure 50 for fine tuning the alignment. Small misalignments due to the strong lens can be corrected by relatively larger movements of the weak lens steering the beam in a direction opposite to the strong lens 16. Once the strong lens 16 is aligned and in position, it is securely bonded in place. Thereafter, the flexure 50 on which the weak lens 20 is mounted is positioned bonded in place when the weak lens is optically aligned in a position that corrects any misalignment of the strong lens and causes the end point of the beam 24 to be optically coupled with the next component in the path; here a modulator 12.

Of course, the flexure 50 securing the weak lens 20 may also suffer some misalignment when bonded in place. However, since small misalignments in the weak lens 20 have relatively little effect on the final position of the beam 24 the optically coupling is improved overall. Optionally, the strong lens 16 can also be positioned and bonded in place with the aid of a flexure 50. To the extent the flexure 50 facilitates positioning any or all of the optical components may be secured with a flexure 50.

Passive placement refers to pick and place of components using machine vision (i.e., using a machine to pick and place components guided by a camera looking at the placement). Active alignment refers to powering up the laser and aligning the components while monitoring the coupling.

Ideally, the strong lenses 50, or more generally stronger optical components, are placed passively and the weak lens 20, or lenses, are placed actively using the flexure 50. This reduces the number of active alignment elements and decreases the overall module assembly cycle time. The stronger optics will be more stable then if placed and bonded actively, as the bonds will not be stressed.

Figure 8:
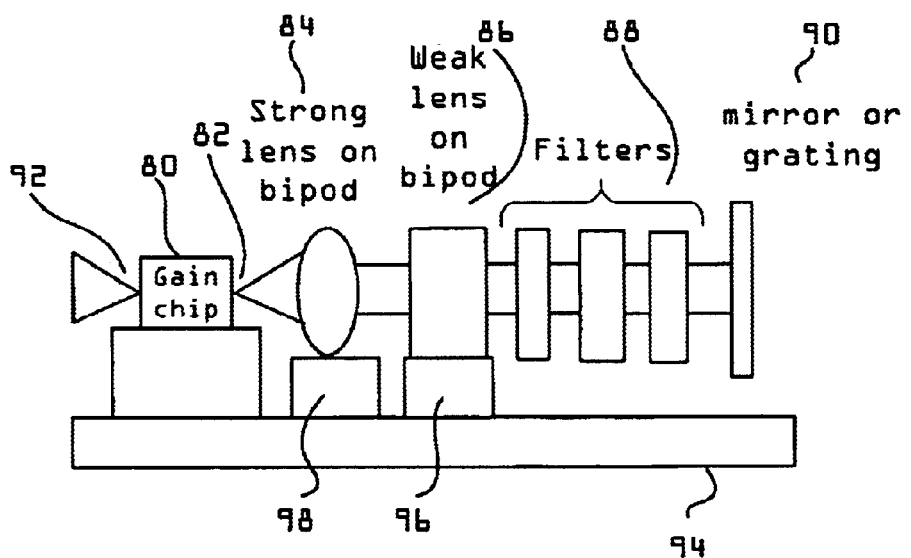
FIG. 8 is a block diagram of a weak lens and strong lens used in an external cavity laser.

FIG. 8 shows another embodiment of the present invention using the flexure 50 using a weak lens 20 on a flexure 50 to tune the optical coupling in an external cavity laser. A laser gain chip 80 produces a beam from a back facet 82. The beam proceeds through a strong lens 84, a weak lens 86 and a plurality of filters 88. The beam is then reflected back with a mirror or reflective grating 90 back through the filters 88, weak lens 86, and strong lens 84, to produce a beam out of the front facet 92 of the gain chip 80. As above, once the strong lens 84 is bonded in place, the weak lens 86 is secured to the substrate 94 with a flexure 96. The flexure 96 facilitates placement of the weak lens 86 such that misalignments of the other optical components, and particularly the strong lens 84, can be corrected. Optionally, the strong lens 84 or any of the other components can also be mounted to the substrate 94 with a bipod flexure 98 as shown. With this arrangement, precise optical coupling can be obtained greatly increasing manufacturing yield and chip performance.

Embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An optical device, comprising:
   a strong lens mounted to a substrate;
   a weak lens; and
   a flexible mount to actively attach said weak lens to said substrate, said weak lens mounted in a position to compensate for misalignments of said strong lens,
   said flexible mount comprising:
      at least one pair of legs made of a flexible material, said pair of legs to be secured to said substrate; and
      a bridge connecting said legs, wherein said weak lens is mounted to a top of said bridge, wherein when said bridge is translated in a y direction perpendicular to said substrate, said pair of legs give elastically in an x-direction.

2. The optical device as recited in claim 1 wherein said weak lens steers a beam to a lesser extent than said strong lens.

3. The optical device as recited in claim 1 positioned to optically couple a beam between two components.

4. The optical device as recited in claim 3 wherein said two components comprise a laser and a modulator.

5. The optical device as recited in claim 1 wherein said optical device comprises an external cavity laser.

6. The optical device as recited in claim 1 wherein said strong lens comprises a molded aspherical lens and said weak lens comprises a graded index (GRIN) lens.

7. An optical module, comprising:

a laser to produce a beam along an optical axis parallel to a substrate;

a strong lens substantially aligned to steer said beam along said optical axis;

a weak lens to steer said beam;

a flexure to actively mount said weak lens in a position to steer said beam along said optical axis to compensate for misaligmnents of said strong lens; and a ferrule connection aligned to receive the beam from said weak lens, wherein said flexure comprises:

at least one pair of legs made of a flexible material, said pair of legs to be secured to said substrate; and a bridge connecting said legs, wherein said weak lens is mounted to a top of said bridge, wherein when said bridge is translated in a y direction perpendicular to said substrate, said pair of legs give elastically in an x-direction.

8. The optical module as recited in claim 7 wherein said strong lens comprises a molded aspherical lens and said weak lens comprises a graded index (GRIN) lens.

9. The optical module as recited in claim 8 further comprising:

an isolator module mounted along said optical axis between said strong lens and said weak lens.

10. The optical module as recited in claim 9 wherein said isolator module is mounted to a second flexure with said strong lens.

11. The optical module as recited in claim 7, further comprising:

a second flexure to mount said strong lens.

12. A method for correcting an optical misalignment between optical devices, comprising:

passively positioning a first lens over a surface to steer a beam substantially along an optical axis, bonding said first lens to said surface;

providing a flexible mount having at least one pair of legs made of a flexible material and a bridge connecting said legs;

mounting a second lens, weaker than said first lens, to a top of said bridge, wherein when said bridge is translated in a y direction perpendicular to said substrate, said pair of legs give elastically in an x-direction; and actively aligning the second lens, in a position to steer said beam along said optical axis to compensate for misalignment of said first lens.

13. The method for correcting an optical misalignment between optical devices as recited in claim 12, further comprising:

pushing on the flexible mount carrying said second lens to adjust a y position of the second lens; and dragging the flexible mount in a plane parallel with said optical axis to change an x position of said second lens.

14. The method for correcting an optical misalignment between optical devices as recited in claim 12, further comprising:

placing a laser in front of an input end of said first lens; and placing a modulator in back of an output end of said second lens.

15. The method for correcting an optical misalignment between optical devices as recited in claim 12, further comprising:

placing a laser before an input end of said lens; and placing one of a mirror and grating after an output end of said second lens.

16. The method for correcting an optical misalignment between optical devices as recited in claim 12, further comprising:

using one of adhesive, laser bonding, and solder to secure said flexible mount in place.

17. The method for correcting an optical misalignment between optical devices as recited in claim 12, further comprising:

positioning an isolator module between said first lens and said second lens.

* * * * *